US010311317B2

(12) United States Patent
Kanamaru

(10) Patent No.: US 10,311,317 B2
(45) Date of Patent: Jun. 4, 2019

(54) TEACHER DATA GENERATION METHOD

(71) Applicant: HONDA MOTOR CO., LTD., Tokyo (JP)

(72) Inventor: Tomoyuki Kanamaru, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 21 days.

(21) Appl. No.: 15/434,950

(22) Filed: Feb. 16, 2017

(65) Prior Publication Data
US 2017/0277976 A1 Sep. 28, 2017

(30) Foreign Application Priority Data

Mar. 25, 2016 (JP) .................................. 2016-062606

(51) Int. Cl.
G06K 9/00 (2006.01)
G06K 9/62 (2006.01)
(Continued)

(52) U.S. Cl.
CPC ......... G06K 9/2054 (2013.01); G06K 9/6255 (2013.01)

(58) Field of Classification Search
USPC ........................................................ 382/159
See application file for complete search history.

(56) References Cited

U.S. PATENT DOCUMENTS 6,487,304 B1 * 11/2002 Szeliski .................. G06K 9/20
382/107
6,674,461 B1 * 1/2004 Klapman .............. G06T 3/4007
348/42
(Continued)

FOREIGN PATENT DOCUMENTS

JP 2008-287378 11/2008
JP 2009-069996 4/2009
(Continued)

OTHER PUBLICATIONS

"Three-Dimensional Rotation Immutable Character Recognition", Ryo Narita et al., Image Recognition-Understanding Symposium, MIRU2011, Jul. 2011, Information Processing Society of Japan Electronic Library.
(Continued)

Primary Examiner — Kathleen Y Dulaney
(74) Attorney, Agent, or Firm — Rankin, Hill & Clark LLP

(57) ABSTRACT

Provided is a method for generating teacher data for image recognition while reducing the number of images used as the basis. A captured image is obtained by imaging an object by an imaging device C arranged at a first designated position $P_i$. A basic image region $S_i$ is extracted from the captured image. The teacher data is generated as a result of coordinate transformation of the basic image region $S_i$ from one image coordinate system to a coordinate system of a captured image by the imaging device C on the assumption that the imaging device C is arranged at a second designated position $P_j$ which is different from the first designated position $P_i$.

2 Claims, 5 Drawing Sheets

(51) Int. Cl.
*G06K 9/32* (2006.01)
*G06K 9/46* (2006.01)
*G06K 9/20* (2006.01)

(56) References Cited

U.S. PATENT DOCUMENTS

| | | | | |
|---|---|---|---|---|
| 7,146,036 | B2* | 12/2006 | An Chang | G06K 9/2036 382/154 |
| 7,650,030 | B2* | 1/2010 | Shan | G06K 9/00785 382/155 |
| 8,457,390 | B1* | 6/2013 | Barker | G06K 9/6256 382/159 |
| 8,600,192 | B2* | 12/2013 | Liu | G06T 7/593 382/154 |
| 8,649,633 | B2* | 2/2014 | Subbian | G06T 7/33 382/294 |
| 8,675,047 | B2* | 3/2014 | Sakano | G01C 11/06 348/46 |
| 9,118,897 | B2* | 8/2015 | Wiegand | H04N 13/111 |
| 2004/0013295 | A1* | 1/2004 | Sabe | G06K 9/00664 382/153 |
| 2004/0061795 | A1* | 4/2004 | Kondo | G06T 7/20 348/239 |
| 2004/0066966 | A1* | 4/2004 | Schneiderman | G06K 9/527 382/159 |
| 2005/0271301 | A1* | 12/2005 | Solomon | G01C 11/02 382/294 |
| 2006/0056655 | A1* | 3/2006 | Wen | G06F 19/3418 382/103 |
| 2006/0083423 | A1* | 4/2006 | Brown | G06K 9/00362 382/159 |
| 2006/0233423 | A1* | 10/2006 | Najafi | G06K 9/3208 382/103 |
| 2007/0086627 | A1* | 4/2007 | Kim | G06K 9/00241 382/118 |
| 2007/0127816 | A1* | 6/2007 | Balslev | G06K 9/48 382/181 |
| 2009/0090781 | A1* | 4/2009 | Ye | G06K 7/14 235/462.09 |
| 2009/0132436 | A1* | 5/2009 | Pershing | G06Q 30/02 705/400 |
| 2011/0115921 | A1* | 5/2011 | Wang | G06T 15/205 348/187 |
| 2011/0170781 | A1* | 7/2011 | Bronstein | G06K 9/6289 382/190 |
| 2011/0182476 | A1* | 7/2011 | Kim | G06T 7/85 382/106 |
| 2011/0222769 | A1* | 9/2011 | Galic | G06K 9/00456 382/173 |
| 2012/0128204 | A1* | 5/2012 | Aoba | G06K 9/00208 382/103 |
| 2012/0155751 | A1* | 6/2012 | Aoba | G06T 7/00 382/159 |
| 2012/0250982 | A1* | 10/2012 | Ito | G06T 7/194 382/159 |
| 2012/0321173 | A1* | 12/2012 | Mitarai | G01B 11/03 382/154 |
| 2013/0034269 | A1* | 2/2013 | Kiyota | E02F 9/26 382/103 |
| 2013/0064444 | A1* | 3/2013 | Gordo | G06K 9/6256 382/159 |
| 2014/0253679 | A1* | 9/2014 | Guigues | G01S 17/89 348/42 |
| 2014/0301635 | A1* | 10/2014 | Soatto | G06K 9/4671 382/159 |
| 2015/0310306 | A1* | 10/2015 | Song | G06K 9/46 382/159 |

FOREIGN PATENT DOCUMENTS

| | | |
|---|---|---|
| JP | 2011-210087 | 10/2011 |
| JP | 2016-006616 | 1/2016 |

OTHER PUBLICATIONS

"Matching 3-D Transformed Images Using Scale-Invariant Feature Transform", Hiroki Okago, Kochi University of Technology, Thesis for Bachelor Degree, Mar. 1, 2013.
Yoshida, et al. "AR/VR Robust Planar Pose Estimation by Viewpoint Generative Learning", Published Jun. 10, 2013; Japan Industrial Publishing Co., Ltd., Japan, Image Lab vol. 24, No. 6, pp. 51-58. English Abstract of the Publication Included.
Japanese Office Action dated Oct. 3, 2017, 4 pages.
Japanese Office Action dated Mar. 27, 2018, 2 pages.

* cited by examiner

TEACHER DATA GENERATION METHOD

BACKGROUND OF THE INVENTION

Field of the Invention

The present invention relates to a technology of generating teacher data for image recognition.

Description of the Related Art

There has been proposed a method for recognizing two-dimensional rotated character by configuring a discriminator with a learning sample generated by performing three-dimensional rotation processing on a computer in advance (for example, refer to Non-Patent Literature 1: [Three-Dimensional Rotation Immutable Character Recognition] by Ryo Narita et al. ([Image Recognition•Understanding Symposium (MIRU2011)] July 2011) Information Processing Society of Japan Electronic Library (https://ipsj.ixsq.nii.ac.jp/ej/index.php?action=pages_main&active_action=repository_action_common_download&item_id=77644&item_no=1&attribute_id=1&file_no=1& page_id=13&block_id=8). There has been also proposed a method for extracting an image of the same object by using SIFT (Scale-Invariant Feature Transform) which recognizes the object by using a luminance gradient of the image. More specifically, this is a method of matching the same object between an original image and an image which has been generated by three-dimensionally rotating the original image and projecting it on a two-dimensional plane (for example, refer to Non-Patent Literature 2: [Matching 3-D Transformed Images Using Scale-Invariant Feature Transform] by Okao (Kochi University of Technology, Thesis for Bachelor Degree (Mar. 1, 2013) (http://www.kochitech.ac.jp/library/ron/2012/2012info/1130317.pdf)).

SUMMARY OF THE INVENTION

Problems to be Solved by the Invention

However, in order to extract an object from an image, in a case of generating teacher data for image recognition based on image data of the object captured from a large number of different viewpoints (for example, 7000 or more), it is concerned that the man-hour and the cost required for generating the teacher data would considerably increase.

Therefore, the object of the present invention is to provide a method for generating teacher data for image recognition while reducing the number of images used as the basis.

Means for Solving the Problem

The present invention is a method for generating teacher data for image recognition of an object, comprising: a step of obtaining a plurality of captured images by imaging the object by imaging device arranged at each of a plurality of first designated positions; a step of extracting a basic image region from each of the plurality of captured images; and a step of generating the teacher data as a result of coordinate transformation of the basic image region from one image coordinate system to each coordinate system of the plurality of captured images by the imaging device on an assumption that the imaging device is arranged at each of a plurality of second designated positions which are different from the plurality of first designated positions.

Effect of the Invention

According to the method of the present invention, it is able to generate sufficient number of teacher data necessary for image recognition while reducing the number of images used as the basis.

BRIEF DESCRIPTION OF THE DRAWINGS

FIG. 3A and FIG. 3B are explanatory diagrams in which FIG. 3A illustrates a method of changing a camera position, and FIG. 3B illustrates internal parameter setting of the camera.

FIG. 4A and FIG. 4B are explanatory diagrams in which FIG. 4A illustrates images of an object actually captured from a plurality of different positions, and FIG. 4B illustrates estimation images of the object on an assumption that the object is captured from the plurality of different positions.

DESCRIPTION OF THE PREFERRED EMBODIMENTS

A method for generating teacher data for image recognition as an embodiment of the present invention will be described.

Figure 1:
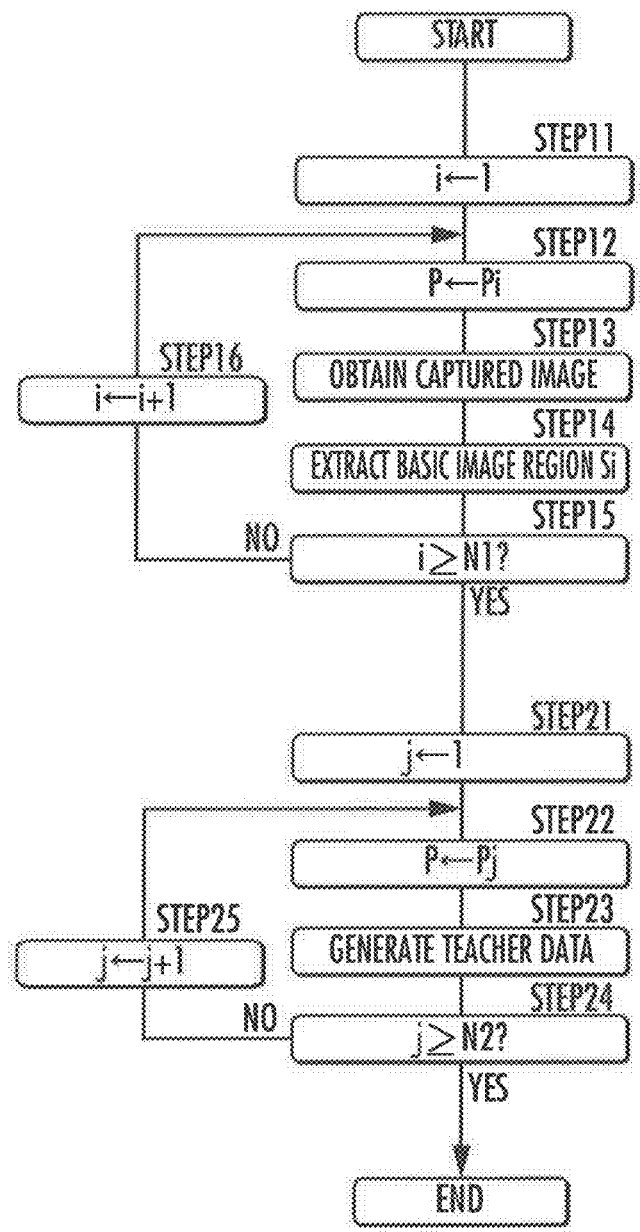
FIG. 1 illustrates an explanatory diagram showing a producing method of teacher data as an embodiment of the present invention.

First, a first index i which expresses the number of captured images used as the basis is set to "1" (FIG. 1/STEP11). The position P of an imaging device C is adjusted to a first designated position $P_i$ (FIG. 1/STEP12). The posture of the imaging device C is adjusted so that the optical axis thereof is directed to one point of an actual space polar coordinate system.

Figure 2:
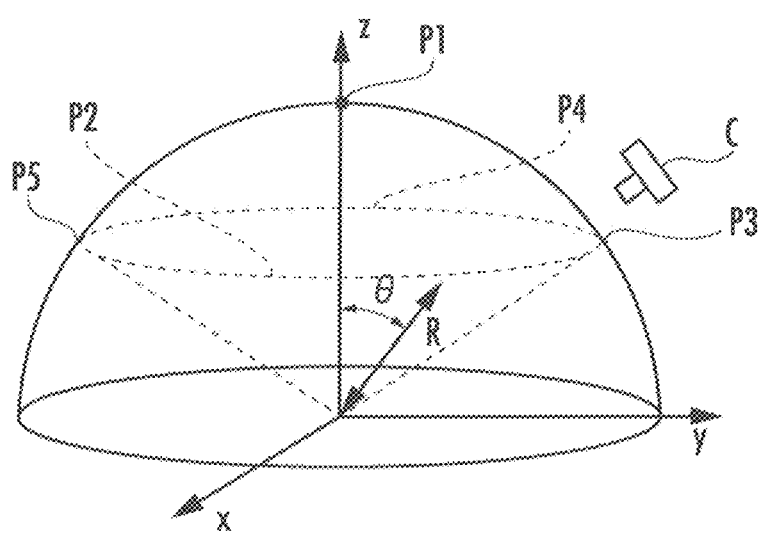
FIG. 2 is an explanatory diagram illustrating an imaging position of an imaging device C.

For example, as shown in FIG. 2, on a hemisphere face of a radius R, having the origin of the three-dimensional polar coordinate system as the center and having a pole above the center, in addition to the pole $P_1$, four points $P_2$ to $P_5$ which are arranged at equal intervals in the longitude direction at a latitude expressed as $\theta_i=\theta(20°\leq\theta\leq70°)$, are defined as the first designated positions. In this case, the first designated position $P_i$ is expressed by coordinate values of the three-dimensional polar coordinate system $(r_i \sin \theta_i \cos \varphi_i, r_i \sin \theta_i \sin \varphi_i, r_i \cos \theta_i)$. The position and the posture of the imaging device C is adjusted manually by the operator, and then fixed by an appropriate tool such as the platform or the like, or may be automatically adjusted by a driving device such as a robot arm.

Next, the Object is captured by the imaging device C at position P to obtain the captured image (FIG. 1/STEP13).

A basic image region $S_i$ is extracted from the captured image (FIG. 1/STEP14). For example, a person (an operator) manipulates through an input interface while visually recognizing the captured image displayed through an output interface to extract a region recognized as being a substantially flat surface as the basic image region $S_i$. The extraction of the basic image region $S_i$ is performed only for a few numbers of arbitrary captured images. The distance r between the optical center of the imaging device and the basic image region $S_i$ is measured by an appropriate range sensor.

It is determined whether or not the first index i is a first specified number $N_1$ or more (FIG. 1/STEP15). The first specified number $N_1$ is, for example, set to "5". If it is determined that the first index i is less than the first specified number $N_1$ (FIG. 1/STEP15 . . . NO), the first index i is increased by "1" (FIG. 1/STEP16). And then, the processes after the adjustment of the position and the posture of the imaging device C are repeated (FIG. 1/STEP12 to STEP15). Each of a plurality of imaging devices C can be arranged at each of the plurality of designated positions, and used.

If it is determined that the first index i is equal to or more than the first specified number $N_1$ (FIG. 1/STEP15 . . . YES), a second index j expressing the number of generated estimation images, is set to "1" (FIG. 1/STEP21). The position P of a virtual imaging device C is adjusted to a second designated position $P_j$ which is different from the first designated position $P_i$ (FIG. 1/STEP22). For example, the second designated position $P_j$ is also defined on a hemisphere face similar to the first designated position $P_i$ (refer to FIG. 2).

Figure 3A:
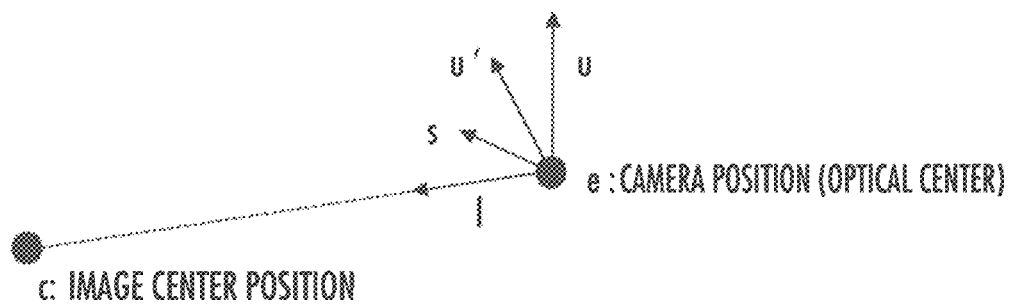

More specifically, in addition to the optical center P=e (three-dimensional vector) of the imaging device C as shown in FIG. 3A, by using unit vector l=(c−e)/|c−e| expressing the azimuth of the center of the image (basic image region $S_i$) with the optical center P of the image device C as the reference, unit vector u'=s×l and unit vector s=l×u expressing the upper direction of the imaging device C after the optical center of the imaging device C is moved, the coordinate transformation matrix $M_1$ which changes the optical center position P of the imaging device C is defined by expression (1).

[Expression 1]

$$M_1 = \begin{bmatrix} s & u' & -l & -e \\ 0 & 0 & 0 & 1 \end{bmatrix} \quad (1)$$

Figure 3B:
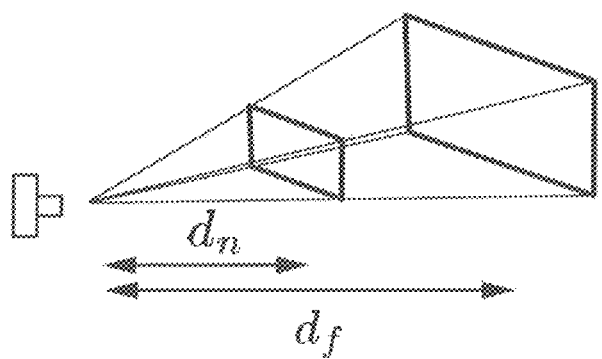

In addition to the lower limit value $d_n$ and the upper limit value $d_f$ of the depth of field of the imaging device C as shown in FIG. 3B, by using the angle of view $\theta_y$ in the vertical direction, the aspect ratio a of the angle of view $\theta_x$ in the horizontal direction with respect to the angle of view $\theta_y$ in the vertical direction, and f=1/tan($\theta_y$/2), the transformation matrix $M_2$ based on internal parameter of the imaging device C is defined by expression (2).

[Expression 2]

$$M_2 = \begin{bmatrix} f/a & 0 & 0 & 0 \\ 0 & f & 0 & 0 \\ 0 & 0 & \frac{d_f + d_n}{d_n - d_f} & \frac{2 d_f d_n}{d_n - d_f} \\ 0 & 0 & -1 & 0 \end{bmatrix} \quad (2)$$

As a result of coordinate transformation of the basic image region $S_i$ according to expression (3), $S_i\hat{}$ is generated as one of the teacher data (FIG. 1/STEP23).

[Expression 3]

$$S_i\hat{} = M_2 M_1 S_i \quad (3)$$

It is determined whether or not the second index j is a second specified number $N_2$ or more (FIG. 1/STEP24). The second specified number $N_2$ is set to a sufficient number necessary as the teacher data for image recognition, for example "7000". If it is determined that the second index j is less than the second specified number $N_2$ (FIG. 1/STEP24 . . . NO), the second index j is increased by "1" (FIG. 1/STEP25). And then, the processes after the adjustment of the position and the posture of the imaging device C are repeated (FIG. 1/STEP22 to STEP24). Then, if the second index j is determined to be equal to or more than the second specified number $N_2$ (FIG. 1/STEP24 . . . YES), the series of processing terminates. In addition to the basic image region obtained as above, the estimation image group as calculated above is accumulated in the database as the teacher data.

After that, the basic image region is extracted from the captured image obtained under an arbitrary environment, and the extraction result is collated with or used for pattern matching with the teacher data accumulated in the database, thereby recognizing that an object related to the teacher data exists in the actual space corresponding to the basic image region.

EXAMPLE

Figure 4A:
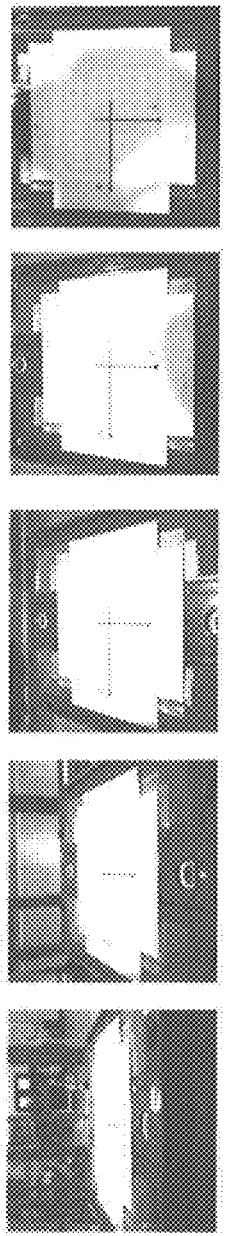
Figure 4B:
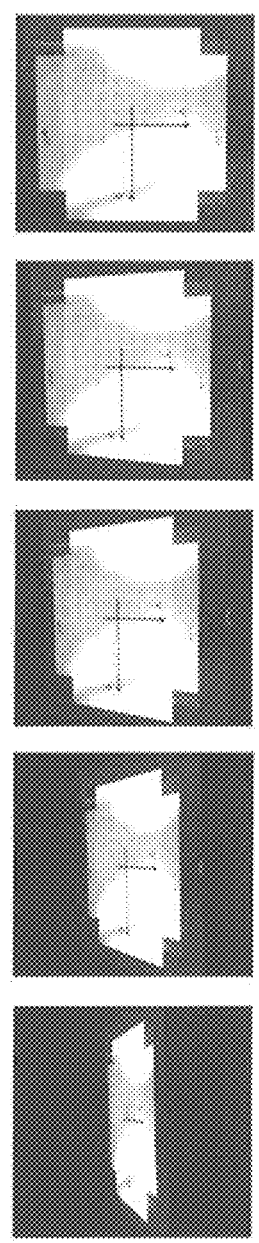

In a three-dimensional coordinate system having a surface center of an object having a substantially rectangular flat plate shape as the origin and its surface being a part of the x-y plane, the object was imaged by intermittently changing the latitude (or the elevation angle in the three-dimensional polar coordinate system) of the position of the imaging device C on the hemisphere face having a pole on the z axis, while keeping the longitude constant. FIG. 4A shows the actual captured images in such case in order from the left. FIG. 4B shows the estimation images according to the above method in the case it is assumed that the same object is imaged by changing the position of the imaging device C similarly from the left.

Figure 5:
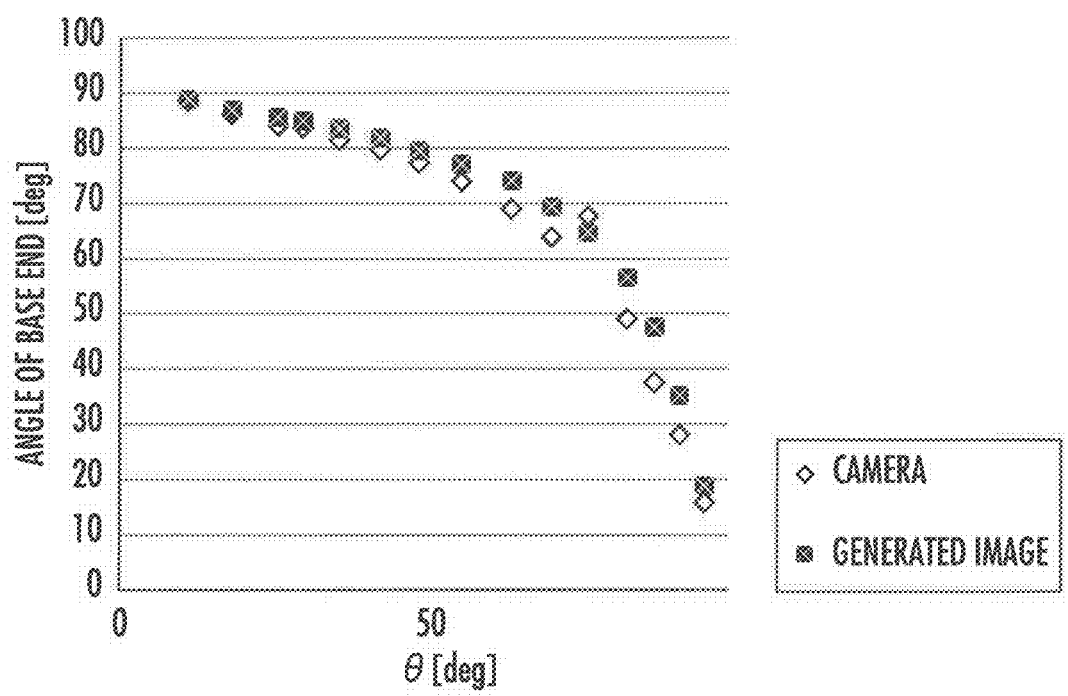
FIG. 5 is an explanatory diagram illustrating an evaluation result of a deviation between the actual captured images and the estimation images.

FIG. 5 shows by plotting the relation between an elevation angle θ expressing an actual (or virtual) position of the imaging device C and an angle in the image coordinate system of one corner angle of the substantially rectangular flat plate shaped object in each of the actual captured image and the estimation image. It is assumed to generate the estimation image in the range of 20°≤θ≤160°. As shown in FIG. 5, although there is a tendency that the deviation of the corner angles gradually becomes larger as θ becomes larger (as the position of the imaging device C comes closer to the x-y plane), the maximum relative deviation is 1.9%. Therefore, it is verified that the recognition accuracy of the object is improved by using the estimation image group as the teacher data.

EXPLANATION OF THE REFERENCE SIGNS

C . . . imaging device, $P_1$ to $P_5$ . . . first designated positions, $S_i$ . . . basic image region

What is claimed is:
1. A method for generating teacher data for image recognition of an object, comprising:
a step of obtaining a plurality of captured images by imaging the object by an imaging device arranged at each of a plurality of first designated positions;
a step of recognizing, by an operator via an input interface, a region that is a substantially flat surface as a basic image region, and extracting the basic image region from each of the plurality of captured images;

a step of generating the teacher data as a result of coordinate transformation of the basic image region from one image coordinate system to each coordinate system of the plurality of captured images by the imaging device on an assumption that the imaging device is arranged at each of a plurality of second designated positions which are different from the plurality of first designated positions; and a step of using the teacher data for image recognition, wherein the step of obtaining the plurality of captured images includes obtaining the plurality of captured images by capturing the object by the imaging device which is arranged at positions of each of a plurality of points on a hemisphere face having an origin of a three-dimensional polar coordinate system as a center, as the each of the plurality of first designated positions, and an imaging device posture is adjusted so that an optical axis thereof is directed to the origin of the three-dimensional polar coordinate system, and the step of generating the teacher data includes generating, as the teacher data, each of a plurality of results of the coordinate transformation of each of a plurality of the basic image region individually from the one image coordinate system to the each of coordinate system of the plurality of captured images by the imaging device on an assumption that the imaging device is arranged at positions of each of a plurality of points on the hemisphere face as the each of the plurality of second designated positions and that the imaging device posture is adjusted so that the optical axis thereof is directed to the origin of the three-dimensional polar coordinate system.

2. A method for generating teacher data for image recognition of an object, comprising:

a step of obtaining a plurality of captured images by imaging the object by an imaging device arranged at each of a plurality of first designated positions;

a step of extracting a basic image region from each of the plurality of captured images; and a step of generating the teacher data as a result of coordinate transformation of the basic image region from one image coordinate system to each coordinate system of the plurality of captured images by the imaging device on an assumption that the imaging device is arranged at each of a plurality of second designated positions which are different from the plurality of first designated positions, wherein the step of obtaining the plurality of captured images includes obtaining the plurality of captured images by capturing the object by the imaging device which is arranged at positions of each of a plurality of points on a hemisphere face having an origin of a three-dimensional polar coordinate system as a center, as the each of the plurality of first designated positions, and an imaging device posture is adjusted so that an optical axis thereof is directed to the origin of the three-dimensional polar coordinate system, and the step of generating the teacher data includes generating, as the teacher data, each of a plurality of results of the coordinate transformation of each of a plurality of the basic image region individually from the one image coordinate system to the each of coordinate system of the plurality of captured images by the imaging device on an assumption that the imaging device is arranged at positions of each of a plurality of points on the hemisphere face as the each of the plurality of second designated positions and that the imaging device posture is adjusted so that the optical axis thereof is directed to the origin of the three-dimensional polar coordinate system.

\* \* \* \* \*